United States Patent
Lagnado et al.

(10) Patent No.: US 12,477,482 B2
(45) Date of Patent: Nov. 18, 2025

(54) TRANSMIT POWER CONTROLS

(71) Applicant: Hewlett-Packard Development Company, L.P., Spring, TX (US)

(72) Inventors: Isaac Lagnado, Spring, TX (US); I-Chen Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 342 days.

(21) Appl. No.: 18/264,627

(22) PCT Filed: Mar. 1, 2021

(86) PCT No.: PCT/US2021/020253
§ 371 (c)(1),
(2) Date: Aug. 8, 2023

(87) PCT Pub. No.: WO2022/186811
PCT Pub. Date: Sep. 9, 2022

(65) Prior Publication Data
US 2024/0121729 A1    Apr. 11, 2024

(51) Int. Cl.
*H04W 52/38* (2009.01)
*H04N 21/442* (2011.01)

(52) U.S. Cl.
CPC ...... *H04W 52/38* (2013.01); *H04N 21/44218* (2013.01)

(58) Field of Classification Search
CPC .... H04W 52/38; H04W 52/367; G06V 40/10; G06V 10/82
See application file for complete search history.

(56) References Cited

U.S. PATENT DOCUMENTS

| | | | |
|---|---|---|---|
| 9,515,378 B2 | 12/2016 | Prasad | |
| 9,578,159 B2 | 2/2017 | Muthukumar | |
| 10,372,191 B2 | 8/2019 | Valko et al. | |
| 10,812,125 B1 | 10/2020 | Badic et al. | |
| 2003/0064732 A1 | 4/2003 | McDowell et al. | |
| 2013/0172045 A1 | 7/2013 | Caballero et al. | |
| 2013/0190055 A1 | 7/2013 | Kulas | |

(Continued)

FOREIGN PATENT DOCUMENTS

| | | | |
|---|---|---|---|
| CN | 104224181 B | | 4/2016 |
| JP | 2004172754 A | * | 6/2004 |
| WO | 2020/166740 A1 | | 8/2020 |

OTHER PUBLICATIONS

Close Maro, J. M., et al., "Event-Based Gesture Recognition With Dynamic Background Suppression Using Smartphone Computational Capabilities", Frontiers, vol. 14, Issue 275, Apr. 9, 2020, pp. 1-16.

*Primary Examiner* — Ayodeji O Ayotunde
(74) *Attorney, Agent, or Firm* — Quarles & Brady LLP

(57) ABSTRACT

Examples of transmit power controls are described herein. In some examples, an electronic device includes an imaging capturing device to capture a video stream. In some examples, the electronic device includes video processing circuitry. In some examples, the video processing circuitry may measure background motion in the video stream. In some examples, the video processing circuitry may detect human proximity based on the measured background motion. In some examples, the video processing circuitry may control transmit power in response to the human proximity detection.

15 Claims, 6 Drawing Sheets

(56) References Cited

U.S. PATENT DOCUMENTS

| | | |
|---|---|---|
| 2017/0223234 A1 | 8/2017 | Do et al. |
| 2019/0217774 A1* | 7/2019 | Gao .................... G06V 40/166 |
| 2020/0259515 A1 | 8/2020 | Mueck |
| 2020/0412459 A1* | 12/2020 | Seyed .................. H04B 17/102 |

* cited by examiner

TRANSMIT POWER CONTROLS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
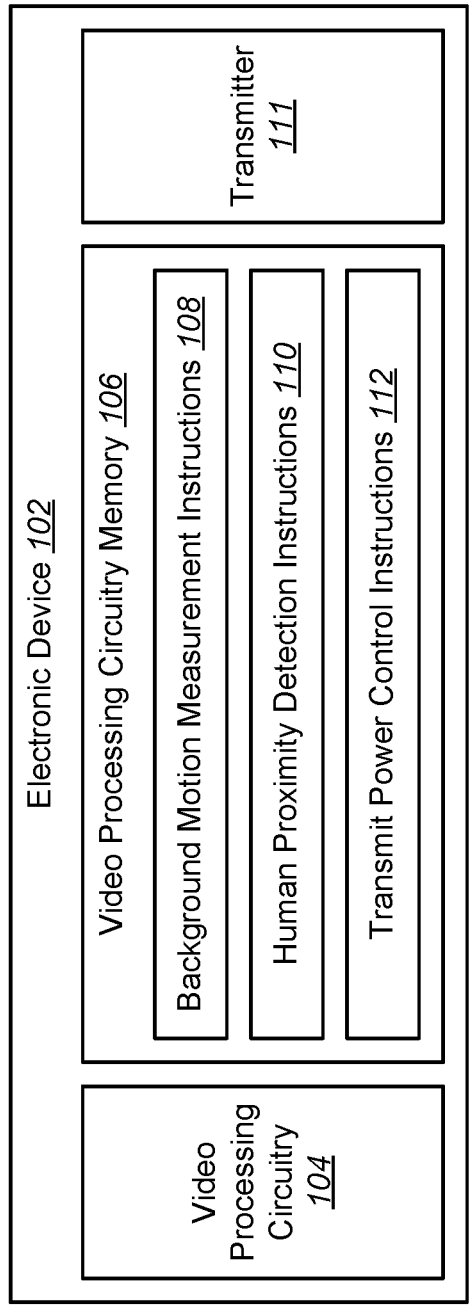
FIG. 1 is a block diagram of an example of an electronic device that may be used to control transmit power.

Some examples of the techniques described herein may be related to transmit power controls. For instance, some electronic devices may transmit wireless (e.g., radio frequency (RF)) signals. For example, an electronic device may transmit wireless signals to communicate with another device (e.g., smartphone, tablet device, audio device, vehicle, base station, and/or router, etc.) and/or a network.

In some examples, transmitted signals may be limited to specific absorption ratio (SAR) guidelines by regulatory authorities. The guidelines may specify an amount of RF energy that may be transmitted by an electronic device in proximity to a person's (e.g., user's) body.

Some approaches may use a proximity sensor to detect how close a user is to a transmitting antenna. When a user is detected, SAR exposure may be mitigated by lowering RF power. A proximity sensor may consume space (e.g., space that may be utilized for another component(s), such as an antenna) and expense in some electronic devices.

Some examples of the techniques described herein may include transmit power control based on an image or video. For instance, a video stream may be utilized to detect if an electronic device is being held and/or if a person is in proximity to the electronic device. Video may be image data. A video stream may be a sequence of image data (e.g., video frames). For example, a video stream may include a sequence of images (e.g., frames of pixel data). In some examples, a video stream may be produced with captured images (e.g., image sensor captures, etc.). For instance, a device (e.g., image capturing device, camera, sensor, apparatus, electronic device, and/or computing device, etc.) may capture and/or receive images of an environment. An environment may be a place. For instance, an environment may be a room, area, building, and/or space, etc.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a block diagram of an example of an electronic device 102 that may be used to control transmit power. An electronic device may be a device that includes electronic circuitry. Examples of the electronic device 102 may include a computer (e.g., laptop computer), a smartphone, a tablet computer, mobile device, camera, etc. The electronic device 102 may include and/or may be coupled to a transmitter 111, video processing circuitry 104, and/or video processing circuitry memory 106. In some examples, components of the electronic device 102 may be coupled via an interface or interfaces (e.g., bus(es)). The electronic device 102 may include additional components (not shown) and/or some of the components described herein may be removed and/or modified without departing from the scope of this disclosure. For example, the electronic device 102 may include an image capturing device (e.g., integrated image capturing device). In some examples, the electronic device 102 may be in communication with a separate image capturing device. For instance, a separate image capturing device (e.g., web cam, camera, etc.) may be attached to and/or may send a video stream to the electronic device 102.

The image capturing device may be a device to capture a video stream. Examples of the image capturing device may include an image sensor(s), optical camera(s), etc. For instance, the image capturing device may be a device to capture optical (e.g., visual) image data (e.g., a sequence of video frames).

The video processing circuitry memory 106 may be an electronic, magnetic, optical, and/or other physical storage device that contains or stores electronic information (e.g., instructions and/or data). The video processing circuitry memory 106 may be, for example, Random Access Memory (RAM), Electrically Erasable Programmable Read-Only Memory (EEPROM), a storage device, an optical disc, and/or the like. In some examples, the video processing circuitry memory 106 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the video processing circuitry memory 106 may be a non-transitory tangible machine-readable or computer-readable storage medium, where the term "non-transitory" does not encompass transitory propagating signals. In some examples, the video processing circuitry memory 106 may include multiple devices (e.g., a RAM card and a solid-state drive (SSD)). In some examples, the video processing circuitry memory 106 may be integrated into the video processing circuitry 104. In some examples, the video processing circuitry memory 106 may include background motion measurement instructions 108, human proximity detection instructions 110, and/or transmit power control instructions 112.

The video processing circuitry 104 may be electronic circuitry to process (e.g., perform an operation(s) on) a video stream. For example, the video processing circuitry 104 may be logic circuitry to perform object detection, object tracking, feature point detection, and/or motion estimation, etc. The video processing circuitry 104 may be a semiconductor-based microprocessor, field-programmable gate array (FPGA), an application-specific integrated circuit (ASIC), and/or other hardware device suitable for retrieval and execution of instructions stored in the video processing circuitry memory 106. The video processing circuitry 104 may fetch, decode, and/or execute instructions stored in the video processing circuitry memory 106. In some examples, the video processing circuitry 104 may include electronic circuitry that includes electronic components for performing an operation or operations described herein without the video processing circuitry memory 106 and/or instructions. In some examples, the video processing circuitry 104 may perform one, some, or all of the aspects, operations, elements, etc., described in one, some, or all of FIG. 1-5.

In some examples, the video processing circuitry 104 may receive a video stream. For instance, the video processing circuitry 104 may receive a video stream from an integrated image capturing device. In some examples, the video processing circuitry 104 may receive a video stream from a separate image capturing device. For instance, the video processing circuitry 104 may receive the video stream via a wired or wireless communication interface (e.g., Universal Serial Bus (USB) port, Ethernet port, Bluetooth receiver, etc.).

In some examples, the video processing circuitry 104 may measure background motion in the video stream. For example, the video processing circuitry 104 may execute the background motion measurement instructions 108 to measure background motion in the video stream. Background motion may be measured or estimated motion of an environment relative to an image capturing device (e.g., the image capturing device and/or the electronic device 102). For example, an environment may include a background region and/or background object(s). A background region may be a region of an image (e.g., video frame) corresponding to the environment or a motionless (e.g., relatively motionless) portion of the environment in a frame of reference (e.g., the Earth, a room, etc.). For instance, a background region may exclude an unfixed object(s) (e.g., potentially moving object(s), person(s), animal(s), tree branch (es), vehicle(s), etc.) relative to the environment and/or the frame of reference. A background object may be an object that is motionless or relatively motionless in the frame of reference (e.g., the Earth, a room, etc.). Examples of a background object may include building(s), road(s), rock(s), the ground, wall(s), structure(s), etc.

In some examples, the video processing circuitry 104 may measure background motion by detecting and/or tracking a feature point or points of the environment and/or a background object(s). For instance, the video processing circuitry 104 may detect a feature point or points (e.g., corner(s), edge(s), keypoint(s), etc.) associated with the environment and/or a background object or objects in video frames. The video processing circuitry 104 may measure the background motion by determining a positional change of the feature point(s) over the video frames. For instance, the video processing circuitry 104 may track the location of the feature point(s) in the video frames. In some examples, tracking the location of the feature point(s) may include matching a feature point (and/or patch including a feature point) in a first video frame to a feature point in a second video frame (e.g., subsequent video frame). For instance, the video processing circuitry 104 may extract pixel information of a feature point and/or patch including the feature point in a first video frame and correlate the patch with windows in the second video frame, where a greatest correlation may indicate the location of the corresponding feature point in the second video frame. A distance (e.g., pixel distance) and/or vector between the feature point in the first video frame and the corresponding feature point in the second video frame may indicate the measured background motion in the video stream. In some examples, multiple feature points may be tracked and corresponding distances and/or vectors may be combined (e.g., averaged) to produce the measured background motion.

In some examples, the video processing circuitry 104 may perform optical flow on a background region to produce the measured background motion. For instance, the optical flow between two successive frames may be computed. Optical flow may be the motion of objects between frames (e.g., consecutive frames, successive frames, etc.) caused by the relative movement between the objects and the camera. In some examples, computing the optical flow may include tracking a set of feature points between two frames, where the tracked set of feature points may enable estimating the motion between the frames.

In some examples, the video processing circuitry 104 may detect, using a machine learning model (e.g., deep learning model(s), neural network(s), etc.), an object(s) in the video stream and/or may exclude the object(s) to measure the background motion in the video stream. For instance, the detected object(s) may be an unfixed object(s) (e.g., object(s) that are unfixed and/or that have a likelihood of moving in an environment). Examples of the detected object(s) may include unfixed object(s), potentially moving object(s), person(s), animal(s), tree branch(es), and/or vehicle(s), etc. For instance, the video processing circuitry 104 may detect, using a machine learning model, a moving object in the video stream and may exclude the object to measure the background motion in the video stream.

Some examples of the techniques described herein may utilize machine learning. Machine learning may be a technique where a machine learning model may be trained to perform a task or tasks based on a set of examples (e.g., data). Training a machine learning model may include determining weights corresponding to structures of the machine learning model. Artificial neural networks may be a kind of machine learning model that may be structured with nodes, layers, and/or connections. Deep learning is a kind of machine learning that utilizes multiple layers. A deep neural network may be a neural network that utilizes deep learning.

Examples of neural networks may include convolutional neural networks (CNNs) (e.g., CNN, deconvolutional neural network, inception module, residual neural network, etc.) and recurrent neural networks (RNNs) (e.g., RNN, multilayer RNN, bi-directional RNN, fused RNN, clockwork RNN, etc.). Different neural network depths may be utilized in accordance with some examples of the techniques described herein.

In some examples, the machine learning model(s) may be trained with a set of training images. For instance, a set of training images may include images of an object(s) for detection (e.g., images of people, animals, vehicles, moving water, tree branches, etc.). The set of training images may be labeled with the class of object(s) and/or location (e.g., bounding box) of object(s) in the images. The machine learning model(s) may be trained to detect the object(s) by iteratively adjusting weights of the model(s) and/or evaluating a loss function(s). The trained machine learning model may detect the object(s) (with a degree of probability, for instance). For example, a video stream may be utilized with computer vision techniques to detect an object(s) (e.g., people, moving objects, and/or pets, etc.). In some examples, the video processing circuitry 104 may be artificial intelligence circuitry. Artificial intelligence circuitry may be circuitry that includes and/or performs machine learning technique(s), deep learning technique(s), and/or neural network technique(s).

In some examples, the video processing circuitry 104 may measure the background motion by tracking a feature point(s) (e.g., a set of feature points) over frames of the video stream in a region (e.g., background region) that excludes the object(s). For instance, the video processing circuitry 104 may determine a portion (e.g., unfixed object region(s), object bounding box(es), etc.) of the video stream (e.g., video frame(s)) that includes the object(s) and may exclude that portion from an operation or operations of the background motion measurement. For instance, the video processing circuitry 104 may exclude the portion from feature point detection, feature point tracking, and/or optical flow to measure the background motion. In some examples, the video processing circuitry 104 may exclude detected feature point(s), and/or motion vector(s), etc., of the portion from the background motion measurement. For instance, a motion vector(s) in the portion corresponding to unfixed object(s) may be excluded from background motion measurement.

In some examples, the video processing circuitry 104 may detect human proximity based on the measured background motion. For instance, the video processing circuitry 104 may execute the human proximity detection instructions 110 to detect human proximity based on the measured background motion. For instance, human proximity may be a condition in which a human is carrying and/or holding the electronic device 102. For instance, if a human is carrying or holding the electronic device 102 (e.g., holding the electronic device 102 for a phone call, for Internet browsing, etc.), in their hand(s), human proximity is occurring (e.g., a human is in proximity to the electronic device 102). In some examples, the video processing circuitry 104 may detect the human proximity in response to determining that the measured background motion satisfies a motion threshold.

In some examples, the video processing circuitry 104 may detect human proximity in response to determining that the measured background motion satisfies a motion threshold. For instance, the video processing circuitry 104 may determine whether the measured background motion satisfies a motion threshold. In some examples, the motion threshold may be expressed in terms of pixel distance (e.g., 3 pixels, 5 pixels, 10 pixels, 50 pixels, 100 pixels, 213 pixels, etc.). For instance, if the length of a motion vector that expresses the measured background motion is greater than or equal to the motion threshold, the motion threshold may be satisfied. In some examples, the motion threshold may be expressed in terms of a rate (e.g., speed, velocity, pixels/second, pixels/frame, etc.). For instance, if the measured background motion (e.g., motion vector) in a period of time (e.g., a quantity of time, between frames, and/or a quantity of frames) is greater than or equal to the motion threshold (e.g., 3 pixels/second, 5 pixels/second, 10 pixels/frame, 50 pixels/frame, 100 pixels/second, 213 pixels/second, etc.), the motion threshold may be satisfied. In some examples, a measurement (between two frames, for instance) and/or a combination measurement (e.g., average over multiple frames) may be utilized as the measured background motion. In some examples, the motion threshold may be utilized to distinguish when the electronic device 102 is moving or not moving. For instance, background motion above the motion threshold may indicate that a laptop is being held by a user on the user's lap. Background motion less than or equal to the motion threshold may indicate that the laptop is placed on a table. In some examples, the motion threshold may allow for some motion (e.g., motion caused by a user typing without carrying the electronic device 102) without indicating that the electronic device 102 is being carried or held.

In some examples, the video processing circuitry 104 may control transmit power of the transmitter 111 in response to the human proximity detection. Transmit power may be a quantity of power (e.g., watts) of a wireless signal transmitted by the electronic device 102. For instance, the electronic device 102 may include the transmitter 111. The transmitter 111 may emit an amount of radio frequency (RF) power.

The electronic device 102 (e.g., video processing circuitry 104) may control the transmit power based on the human proximity detection. For instance, the transmit power may be set to a level of transmit power based on whether human proximity is detected or not. In some examples, a first level may be a non-reduced level (e.g., 32.49, 32.45, 26.94, 26.93, 29.59, 29.58, 25.88, 25.87, 23.24, 23.46, 23.02, etc., decibels relative to one milliwatt (dBm)) and a second level may be a reduced level (e.g., 29.61, 26.67, 24.92, 23.65, 27.38, 24.39, 22.38, 21.36, 19.7, 17.43, 16.75, etc., dBm). In some examples, the first level and the second level may vary based on a waveform, band, and/or slot(s) used. In some examples, a first level may be utilized when human proximity is not detected and a second level may be utilized when human proximity is detected. For Global System for Mobile Communications (GSM)-850 (GSM-850) general packet radio service (GPRS) with Gaussian minimum shift keying (GMSK) with 1 transmit slot, a first level (e.g., non-reduced level) may be 32.49 dBm and a second level (e.g., reduced level) may be 29.61 dBm.

In some examples, the video processing circuitry 104 may control the transmit power in response to the human proximity detection by reducing the transmit power. For instance, the video processing circuitry 104 may execute the transmit power control instructions 112 to control the transmit power in response to the human proximity detection. In some examples, the video processing circuitry 104 may set the transmit power to the second level in response to detecting human proximity. In some examples, the video processing circuitry 104 may control the transmit power by sending a signal (e.g., command, instruction, indicator, etc.) to a component (e.g., transmitter 111 and/or radio controller). For instance, the video processing circuitry 104 may send a signal to the transmitter 111 indicating the second level of transmit power. In some examples, the video processing circuitry 104 may send a signal to increase power (e.g., to remove a power restriction, to discontinue power back-off, etc.) in response to no human proximity detection. In some examples, human proximity detection and/or transmit power control may be binary. For instance, the electronic device 102 (e.g., video processing circuitry 104) may utilize a non-reduced level if human proximity is not detected and may utilize a reduced level if human proximity is detected without another degree of human proximity (e.g., without distance degrees for human proximity). In some examples of the techniques described herein, human proximity detection may be performed without determining or estimating a distance to a person.

In some examples, machine learning (e.g., artificial intelligence) may be utilized to detect motion. For instance, the video processing circuitry 104 may execute a machine learning model that is trained to detect motion. In some examples, the machine learning model may be trained to detect motion from a sleeping individual. For instance, motion from a sleeping individual (e.g., breathing) may be slight, but may be detected in order to control transmit power (e.g., meet SAR guidelines). For example, a machine learning model may be trained to detect a movement pattern from the background motion that corresponds to a sleeping individual. When the machine learning model detects that the electronic device 102 is not moving, an indication may be provided to maintain and/or switch to non-reduced transmit power. When the machine learning model detects that the electronic device 102 is moving, an indication may be provided to maintain and/or switch to reduced transmit power.

In some examples, the electronic device 102 may include an application processor (not shown in FIG. 1). Examples of the application processor may include a general-purpose processor, central processing unit (CPU), and/or a graphics processing unit (GPU). The application processor may be separate from the video processing circuitry 104. For instance, the video processing circuitry 104 may be separate circuitry and/or hardware from the application processor (e.g., general-purpose processor, CPU, and/or GPU of the electronic device 102).

In some examples, the electronic device 102 may include application processor memory. The application processor memory may be an electronic, magnetic, optical, and/or other physical storage device that contains or stores electronic information (e.g., instructions and/or data). The application processor memory may be, for example, Random Access Memory (RAM), Electrically Erasable Programmable Read-Only Memory (EEPROM), a storage device, an optical disc, and/or the like. In some examples, the application processor memory may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the application processor memory may be a non-transitory tangible machine-readable or computer-readable storage medium, where the term "non-transitory" does not encompass transitory propagating signals. In some examples, the application processor memory may include multiple devices (e.g., a RAM card and a solid-state drive (SSD)). In some examples, the application processor memory may be separate from (e.g., separate circuitry from) the video processing circuitry memory 106.

In some examples, the video processing circuitry memory 106 may be included in the application processor memory. For instance, a separate memory map in the application processor memory may be utilized for the video processing circuitry memory 106. A separate memory map may maintain a separation between an operating system of the electronic device 102 and the instructions and/or data for the video processing circuitry memory 106. In some examples, the operations of the video processing circuitry 104 described herein may be performed on an application processor separate from the operating system of the electronic device 102. For instance, the operations may be performed in a virtual machine executed by the application processor.

In some examples, the video stream may be provided to the video processing circuitry 104 and blocked from the application processor. For instance, the video stream may be utilized for human proximity detection without being provided to the application processor (e.g., general-purpose processor, CPU, and/or GPU). In some examples, the video stream may be selectively provided to the application processor. For instance, the video processing circuitry 104 may control a multiplexer and/or selector for providing the video stream to the application processor. In some examples, the video stream may be blocked from the application processor to reduce a security and/or privacy risk of providing the video stream to the application processor and/or to an operating system (OS) of the electronic device 102 while the video stream is being utilized to detect human proximity. In some examples, the video stream may be blocked from the application processor until a user permission indication is received. For instance, the video processing circuitry 104 may unblock the video stream from the application processor in response to a user permission indication. In some examples, the electronic device 102 may receive a user permission indication via an input device (not shown in FIG. 1) of the electronic device 102. For instance, the electronic device 102 (e.g., video processing circuitry 104) may receive a user permission indication for capturing a photo and/or video with the image capturing device, for a video conference, etc. Examples of an input device may include a touchscreen, keyboard, button, microphone, the image capturing device, etc.

In some examples, the electronic device 102 does not include a proximity sensor (e.g., dedicated proximity sensor). For instance, the electronic device 102 may exclude an inductive proximity sensor, a capacitive proximity sensor, a magnetic proximity sensor, and/or an ultrasonic proximity sensor. In some examples, the electronic device 102 excludes any proximity sensor besides the image capturing device.

In some examples, the electronic device 102 may include a communication interface (not shown in FIG. 1) through which the application processor may communicate with an external device or devices (e.g., networked device(s), server(s), smartphone(s), microphone(s), camera(s), printer(s), computer(s), etc.). In some examples, the electronic device 102 may be in communication with (e.g., coupled to, have a communication link with) a display device(s). In some examples, the electronic device 102 may include an integrated display panel(s) and/or integrated microphone(s).

The communication interface may include hardware and/or machine-readable instructions to enable the application processor to communicate with the external device or devices. The communication interface may enable a wired and/or wireless connection to the external device or devices. In some examples, the communication interface may include a network interface card and/or may also include hardware and/or machine-readable instructions to enable the application processor to communicate with various input and/or output devices. Examples of output devices include a display device(s), speaker(s), headphone(s), etc. Examples of input devices include a keyboard, a mouse, a touch screen, etc., through which a user may input instructions and/or data into the electronic device 102.

Figure 2:
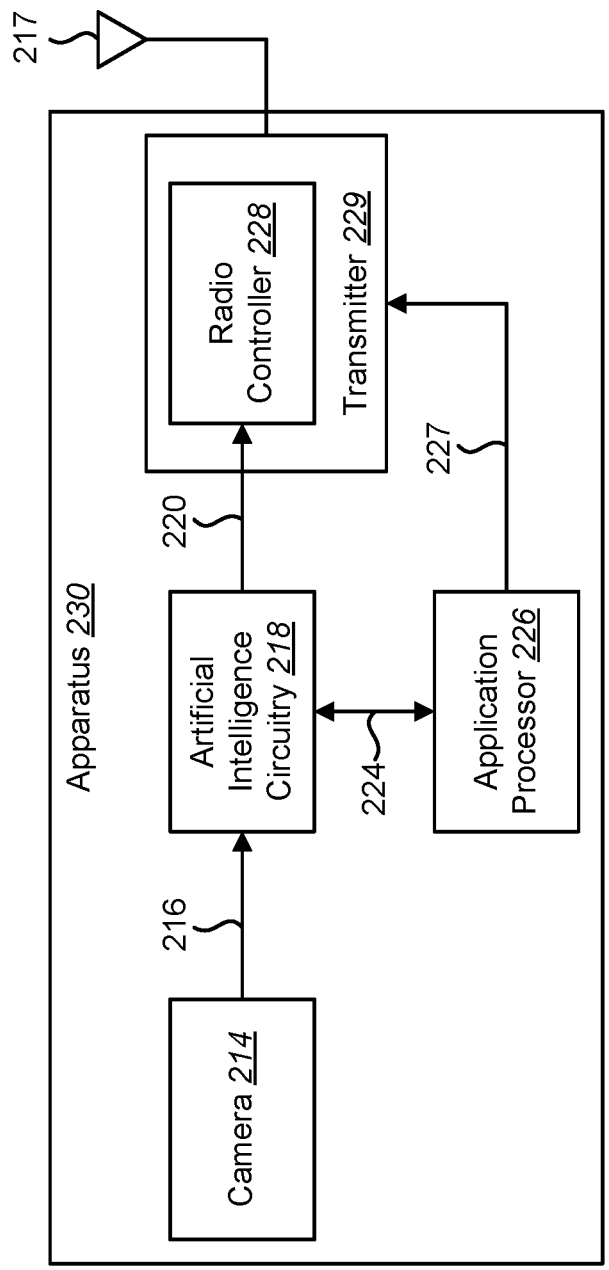
FIG. 2 is a block diagram illustrating an example of an apparatus for transmit power control.

FIG. 2 is a block diagram illustrating an example of an apparatus 230 for transmit power control. In some examples, the apparatus 230 may perform an aspect or aspects of the operations described in FIG. 1. The apparatus 230 may be an example of the electronic device 102 described in FIG. 1. In some examples, the apparatus 230 may include a camera 214, artificial intelligence circuitry 218, a transmitter 229, a radio controller 228, an antenna 217, and/or an application processor 226. Examples of the apparatus 230 may include a computing device, smartphone, laptop computer, tablet device, mobile device, etc.). In some examples, one, some, or all of the components and/or elements of the apparatus 230 may be structured in hardware and/or circuitry. In some examples, the apparatus 230 may perform one, some, or all of the operations described in FIG. 1-5.

A camera 214 may capture a video stream 216. For instance, the video stream 216 may be captured at a frame rate and a resolution. The video may depict an environment and/or object(s). For instance, the video stream 216 may depict an environment and a person. In some examples, the camera 214 may be an example of the image capturing device described in FIG. 1. The video stream 216 may be provided to artificial intelligence circuitry 218. The artificial intelligence circuitry 218 may be an example of the video processing circuitry 104 described in FIG. 1.

The artificial intelligence circuitry 218 may determine a background region of the video stream 216. In some examples, the artificial intelligence circuitry 218 may determine the background region as described in FIG. 1. For instance, the artificial intelligence circuitry 218 may determine the background region by detecting an object (e.g., moving object(s), person, etc.) in the video stream. The background region may be determined as a region (e.g., set of pixels of a frame) of the video stream 216 that does not include the object (e.g., person).

In some examples, the artificial intelligence circuitry 218 may measure motion from the background region. In some examples, measuring motion from the background region may be performed as described in FIG. 1. For instance, the artificial intelligence circuitry 218 may measure the motion by determining a distance between a set of feature points in the background region of a first frame and the set of feature points (e.g., corresponding feature points) in the background region of a subsequent (e.g., second, third, fourth, fifth, etc.) frame.

In some examples, the artificial intelligence circuitry 218 may determine whether a motion condition is satisfied based on the measured motion from the background region. A motion condition may be a motion threshold (e.g., pixel distance threshold, feature point speed threshold, etc.). In some examples, determining whether the motion condition is satisfied may be performed as described in FIG. 1. For instance, the artificial intelligence circuitry 218 may compare the measured motion (e.g., pixel distance, feature point speed, etc.) to a motion threshold. The motion condition may be satisfied if the motion threshold is satisfied.

In some examples, the artificial intelligence circuitry 218 may send an indicator 220 in response to a determination that the motion condition is satisfied. In some examples, sending the indicator may be performed as described in FIG. 1. For instance, the artificial intelligence circuitry 218 may send an indicator 220 to the transmitter and/or radio controller 228. The indicator 220 may indicate a command and/or request to reduce transmit power. For instance, the indicator 220 may direct the transmitter 229 and/or radio controller to switch from a first level to a second level (e.g., to back off transmit power). The transmitter 229 and/or radio controller 228 may reduce transmit power. For instance, the transmitter 229 and/or radio controller 228 may reduce power amplification of a power amplifier(s) of the transmitter 229. The transmitter 229 may transmit a signal(s) at a reduced power using the antenna 217.

In some examples, the artificial intelligence circuitry 218 may send information 224 to and/or receive information 224 from the application processor 226. For instance, some examples of the techniques described herein may enable the artificial intelligence circuitry 218 to analyze the video stream 216 for human proximity detection (e.g., SAR purposes), while reducing a privacy concern that the video stream 216 would propagate to the application processor (e.g., OS) and/or be sent to a network (e.g., the Internet) without user permission. The artificial intelligence circuitry 218 may determine whether to propagate the video stream 216 (as information 224) to the application processor 226 (e.g., OS). In some examples, the video stream 216 may be provided to the artificial intelligence circuitry 218 while the transmitter 229 is active (e.g., sending wireless signals). For instance, to use the camera 214 and/or video stream 216 for human proximity detection (e.g., for SAR purposes), the camera 214 may run while addressing privacy concerns because the artificial intelligence circuitry 218 may block the video stream 216 from being propagated to the application processor 226 (e.g., OS), which may reduce concerns that the video stream 216 could be released outside the apparatus 230 without user permission. In some examples, the artificial intelligence circuitry 218 may control a multiplexer and/or switch to block or unblock a parallel video stream from the camera 214 to the application processor 226.

In some examples, the application processor 226 may send a request and/or user permission indication as information 224 to the artificial intelligence circuitry 218. The artificial intelligence circuitry 218 may allow propagation (e.g., unblocking) of the video stream 216 to the application processor 226 for the purpose allowed by the user permission indication. The application processor 226 may send data 227 to the transmitter 229 for transmission in some examples. For instance, when the video stream is unblocked by the artificial intelligence circuitry 218, the application processor 226 may send video from the video stream to the transmitter as data 227 for transmission (for a video call, for instance).

Figure 3:
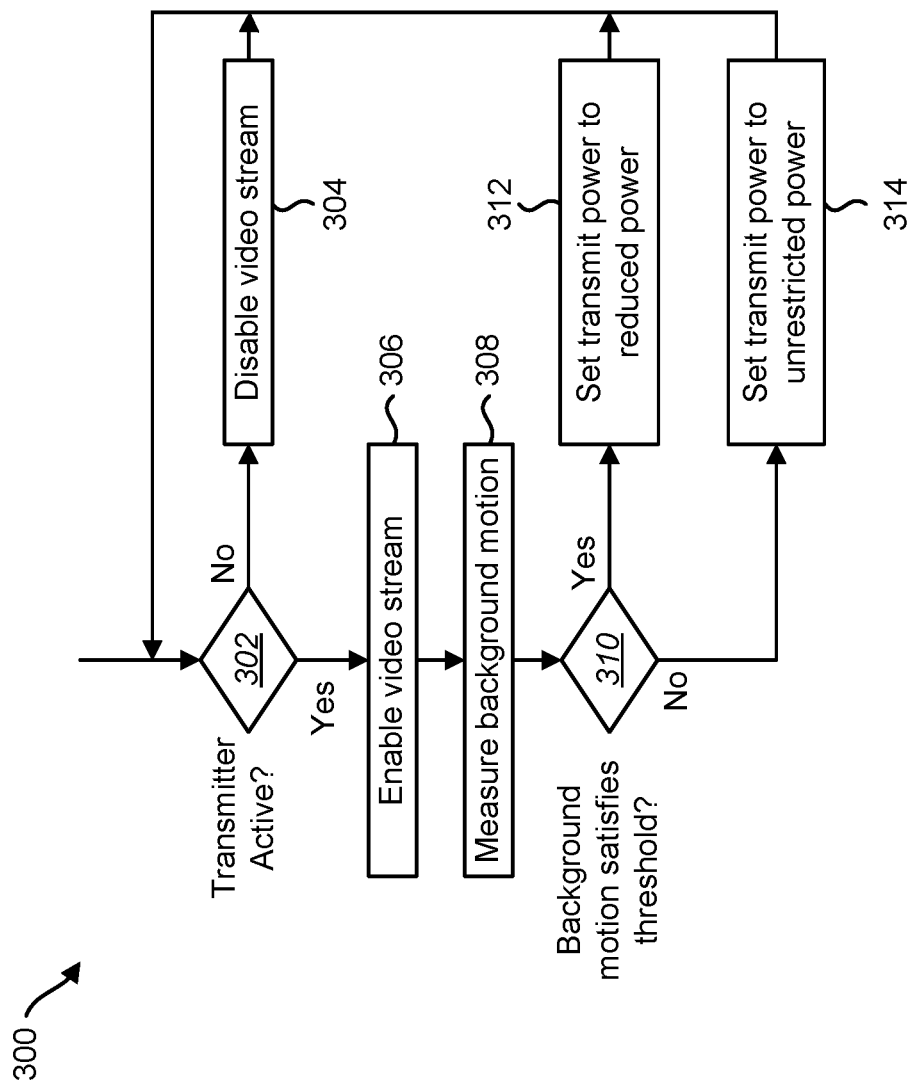
FIG. 3 is a flow diagram illustrating an example of a method for transmit power control.

FIG. 3 is a flow diagram illustrating an example of a method 300 for transmit power control. The method 300 and/or a method 300 element or elements may be performed by an electronic device and/or apparatus (e.g., electronic device 102, apparatus 230, laptop computer, smartphone, tablet device, etc.). For example, the method 300 may be performed by the electronic device 102 described in FIG. 1 and/or the apparatus 230 described in FIG. 2. In some examples, the method 300 may be performed when the electronic device and/or apparatus are active (e.g., booted up).

At 302, an apparatus may determine whether a transmitter is active. For example, the apparatus may include a transmitter or transmitters (e.g., cellular transmitter(s), local area network (LAN) transmitter(s), and/or personal area network (PAN) transmitter(s), etc.). In some examples, the apparatus may determine whether a transmitter is active by checking settings (e.g., transmitter enable or disable settings), transmitter activity (e.g., whether data is being provided to a transmitter for transmission), and/or transmitter indicator(s) (e.g., a signal, data, and/or indicator from the transmitter(s) indicating whether each transmitter is active).

In a case that the apparatus determines that no transmitter is active, the apparatus may disable a video stream at 304. For example, the apparatus may disable a video stream to video processing circuitry and/or artificial intelligence circuitry. In some examples, the apparatus may disable the video stream by deactivating a camera and/or controlling (e.g., multiplexing, switching, etc.) the video stream to shut the video stream off to the video processing circuitry and/or artificial intelligence circuitry. Operation may return to determining whether a transmitter is active at 302.

In a case that the apparatus determines that a transmitter is active, the apparatus may enable a video stream at 306.

For example, the apparatus may enable a video stream to video processing circuitry and/or artificial intelligence circuitry. In some examples, the apparatus may enable the video stream by activating a camera and/or controlling (e.g., multiplexing, switching, etc.) the video stream to provide the video stream to the video processing circuitry and/or artificial intelligence circuitry.

At 308, the apparatus may measure background motion. In some examples, the apparatus may measure background motion as described in FIG. 1 and/or FIG. 2. For instance, the apparatus may track a feature point in a background region between video frames.

At 310, the apparatus may determine whether the background motion satisfies a threshold. In some examples, the apparatus may determine whether the background motion satisfies a threshold as described in FIG. 1 and/or FIG. 2. For instance, the apparatus may compare the measured background motion to a threshold.

In a case that the apparatus determines that the background motion satisfies the threshold, the apparatus may set transmit power to reduced power at 312. In some examples, the apparatus may set transmit power to reduced power as described in FIG. 1 and/or FIG. 2. For instance, the apparatus may send a signal to a transmitter and/or radio controller to reduce and/or limit the transmit power to a reduced level. Operation may return to determining whether a transmitter is active at 302.

In a case that the apparatus determines that the background motion does not satisfy the threshold, the apparatus may set transmit power to unrestricted power at 314. In some examples, the apparatus may set transmit power to unrestricted power as described in FIG. 1 and/or FIG. 2. For instance, the apparatus may send a signal to a transmitter and/or radio controller to allow transmit power to a non-reduced level. Operation may return to determining whether a transmitter is active at 302.

Figure 4:
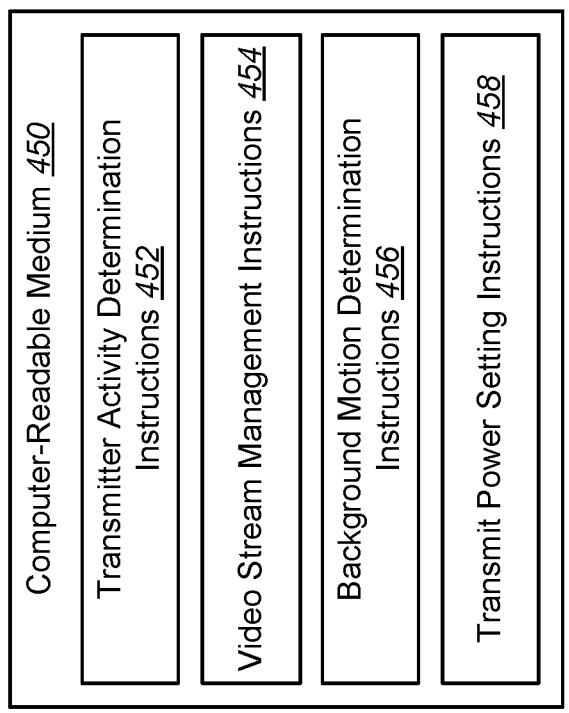
FIG. 4 is a block diagram illustrating an example of a computer-readable medium for transmit power control.

FIG. 4 is a block diagram illustrating an example of a computer-readable medium 450 for transmit power control. The computer-readable medium 450 is a non-transitory, tangible computer-readable medium. The computer-readable medium 450 may be, for example, RAM, EEPROM, a storage device, an optical disc, and/or the like. In some examples, the computer-readable medium 450 may be volatile and/or non-volatile memory, such as DRAM, EEPROM, MRAM, PCRAM, memristor, flash memory, and/or the like. In some examples, the computer-readable medium 450 described in FIG. 4 may be an example of the video processing circuitry memory 106 described in FIG. 1.

The computer-readable medium 450 may include code (e.g., data and/or instructions). For example, the computer-readable medium 450 may include transmitter activity determination instructions 452, video stream management instructions 454, background motion determination instructions 456, and/or transmit power setting instructions 458.

The transmitter activity determination instructions 452 may include instructions when executed cause video processing circuitry of an electronic device to determine whether a transmitter is active. In some examples, determining whether a transmitter is active may be performed as described in FIG. 3.

The video stream management instructions 454 may include instructions when executed cause the video processing circuitry to enable a video stream in response to a first determination that the transmitter is active. In some examples, enabling a video stream may be performed as described in FIG. 3. For instance, the video processing circuitry may activate a camera, multiplex a video stream to the video processing circuitry, and/or switch on a video stream to the video processing circuitry. In some examples, the video stream may be blocked from an OS of the electronic device.

The background motion determination instructions 456 may include instructions when executed cause the video processing circuitry to determine whether background motion in the video stream satisfies a threshold. In some examples, determining whether background motion in the video stream satisfies a threshold may be performed as described in FIG. 1, FIG. 2, and/or FIG. 3.

The transmit power setting instructions 458 may set transmit power to a reduced power in response to a second determination that the background motion satisfies the threshold. In some examples, setting transmit power to a reduced power in response to the second determination may be performed as described in FIG. 1, FIG. 2, and/or FIG. 3. In some examples, the second determination may indicate human proximity to the electronic device.

Figure 5:
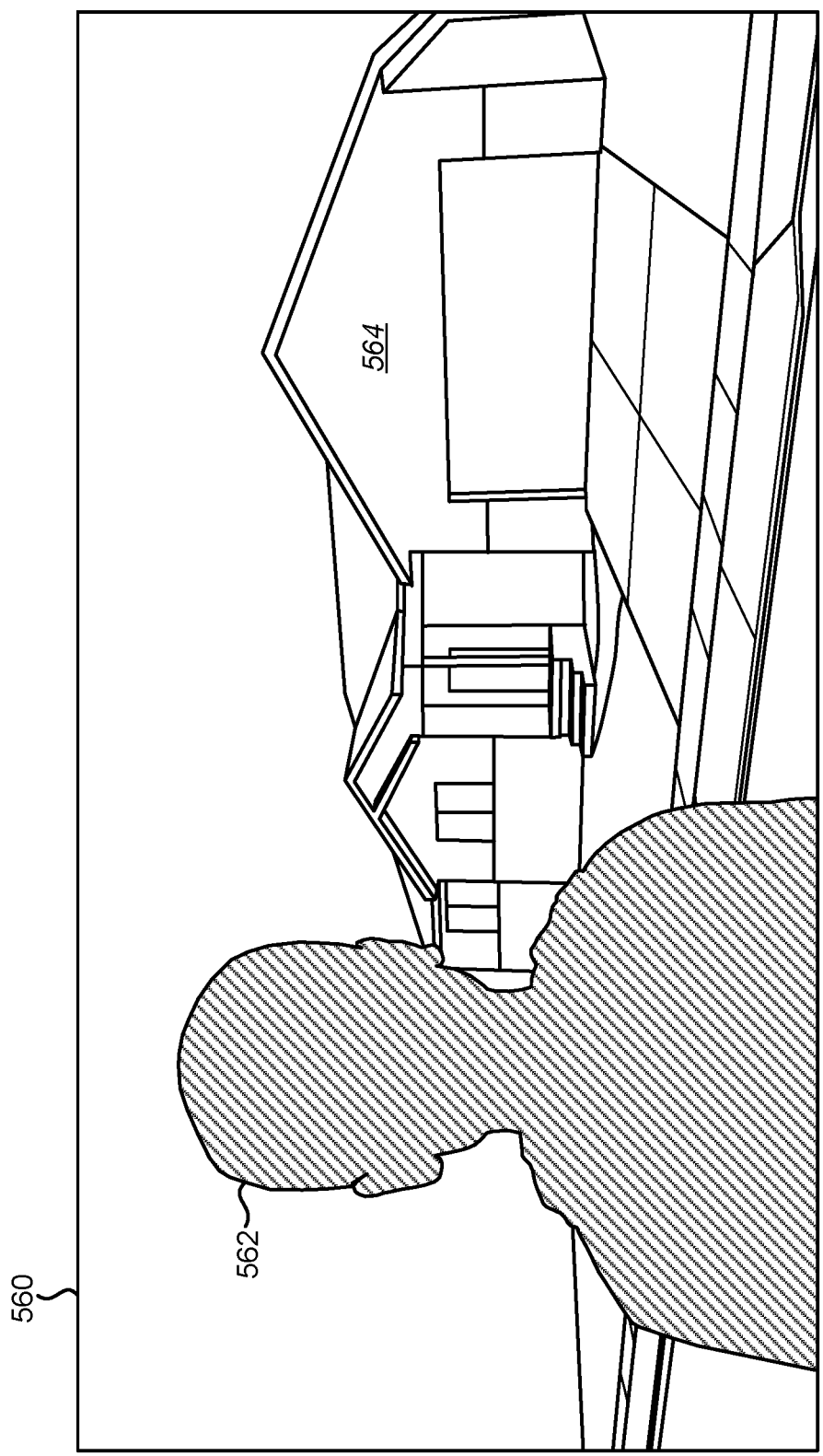
FIG. 5 is a diagram illustrating an example of an image including an object and a background region.

FIG. 5 is a diagram illustrating an example of an image 560 including an object 562 and a background region 564. For instance, a video stream may be captured that depicts an object 562. In some examples of the techniques described herein, video processing circuitry may detect a portion of the video stream corresponding to an object 562 (e.g., a user's head and observable torso). For instance, the video processing circuitry may utilize a machine learning model to detect the object 562.

The video processing circuitry may remove the detected object 562 from the video stream to produce the background region 564. The video processing circuitry may utilize the background region 564 to detect motion in the background region 564. For instance, motion detection may focus on the background region 564 to determine movement of the electronic device relative to the environment. For instance, background feature point detection and/or background object detection may be utilized to detect motion of the background region 564. In some examples, background object detection may be performed using machine learning. For instance, a machine learning model (e.g., convolutional neural network (CNN)) may be trained to detect and/or recognize a background object or objects. Movement of the electronic device relative to the environment may indicate human proximity (e.g., that the electronic device is being carried and/or held by a person).

Figure 6:
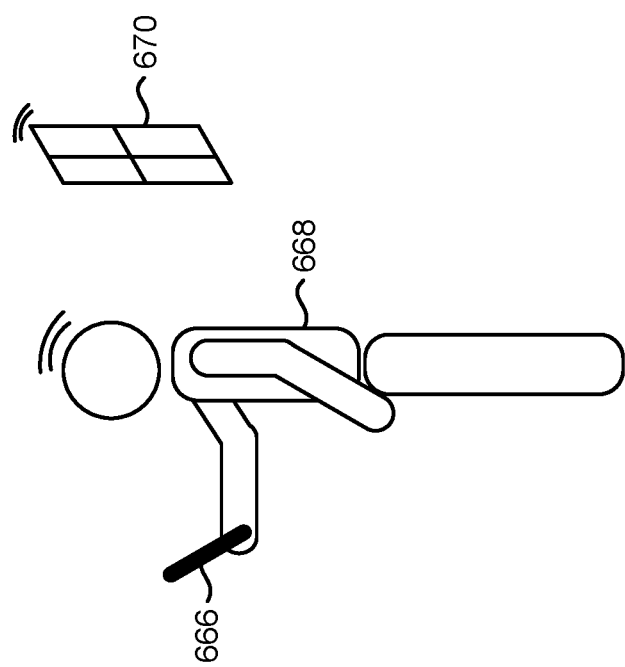
FIG. 6 is a diagram illustrating an example of a user, a background region, and an electronic device that may perform transmit power control in accordance with some of the techniques described herein.

FIG. 6 is a diagram illustrating an example of a user 668, a background region 670, and an electronic device 666 that may perform transmit power control in accordance with some of the techniques described herein. The electronic device 666 may capture a video stream that depicts the user 668 and the background region 670 (e.g., a window). Because the electronic device 666 is being held, the user 668 and the background region 670 may appear to be moving from the perspective of the electronic device 666. The electronic device 666 may detect motion in the background region 670. For instance, motion detection may focus on the background region 670 (e.g., omit the user 668 from motion detection) to determine movement of the electronic device 666 relative to the environment. In this example, motion in the background region 670 is detected, which indicates that the electronic device 666 is being held or carried. Accordingly, the electronic device may reduce transmit power due to human proximity.

Figure 7:
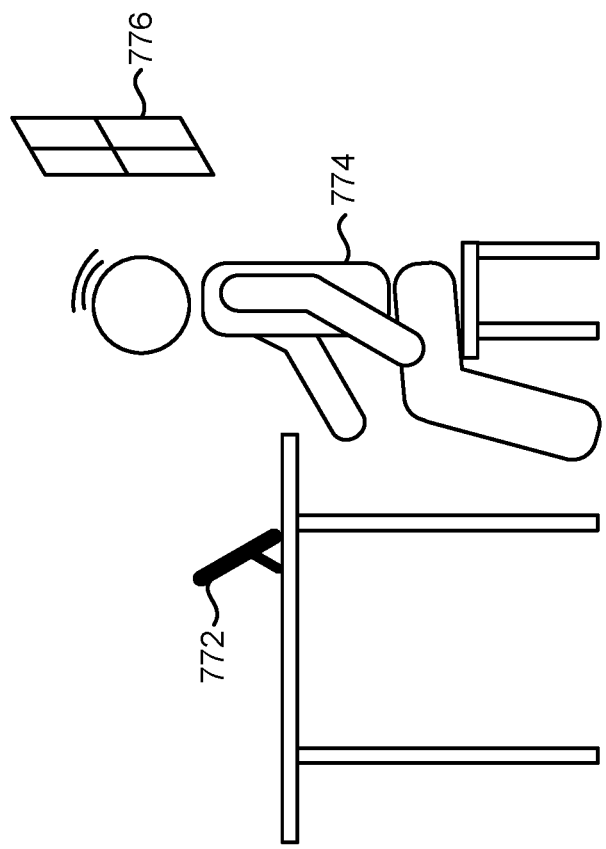
FIG. 7 is a diagram illustrating another example of a user, a background region, and an electronic device that may perform transmit power control in accordance with some of the techniques described herein.

FIG. 7 is a diagram illustrating another example of a user 774, a background region 776, and an electronic device 772 that may perform transmit power control in accordance with some of the techniques described herein. The electronic device 772 may capture a video stream that depicts the user 774 and the background region 776 (e.g., a window). In this example, the electronic device 772 is resting on a table. Because the electronic device 772 is relatively stationary, the background region 776 may appear to be stationary from the perspective of the electronic device 772. The electronic device 772 may not detect motion in the background region 776. For instance, motion detection may focus on the background region 776 (e.g., omit the user 774 from motion detection) to determine movement of the electronic device 772 relative to the environment. In this example, the user 774 is moving relative to the electronic device 772. The user 774 is omitted from motion detection. For instance, the user 774 is omitted from the motion detection to avoid incorrectly determining that the electronic device 772 is in motion. In this example, motion in the background region 776 is not detected, which indicates that the electronic device 772 is not being held or carried. Accordingly, the electronic device 772 may not restrict or reduce transmit power due to human proximity.

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operations, aspects, and/or elements of the examples described herein may be omitted or combined.

The invention claimed is:

1. An electronic device, comprising:
a transmitter; and
video processing circuitry to:
receive a video stream;
measure background motion in the video stream;
detect human proximity based on the measured background motion; and
control transmit power of the transmitter in response to the human proximity detection.

2. The electronic device of claim 1, wherein the video processing circuitry is to detect, using a machine learning model, a moving object in the video stream and is to exclude the moving object to measure the background motion in the video stream.

3. The electronic device of claim 2, wherein the video processing circuitry is to measure the background motion by tracking a set of feature points over frames of the video stream in a region that excludes the moving object.

4. The electronic device of claim 1, wherein the video processing circuitry is to detect the human proximity in response to determining that the measured background motion satisfies a motion threshold.

5. The electronic device of claim 1, wherein the video processing circuitry is to control the transmit power in response to the human proximity detection by reducing the transmit power.

6. The electronic device of claim 1, wherein the electronic device further comprises an application processor that is separate from the video processing circuitry.

7. The electronic device of claim 6, wherein the video stream is provided to the video processing circuitry and blocked from the application processor.

8. The electronic device of claim 7, wherein the video processing circuitry is to unblock the video stream from the application processor in response to a user permission indication.

9. The electronic device of claim 1, wherein the electronic device does not include a proximity sensor.

10. An apparatus, comprising:
a camera to capture a video stream;
artificial intelligence circuitry to:
determine a background region of the video stream;
measure motion from the background region;
determine whether a motion condition is satisfied based on the measured motion from the background region; and
send an indicator in response to a determination that the motion condition is satisfied; and
a radio controller to reduce transmit power in response to the indicator.

11. The apparatus of claim 10, wherein the artificial intelligence circuitry is to determine the background region by detecting a moving object in the video stream.

12. The apparatus of claim 10, wherein the artificial intelligence circuitry is to measure the motion by determining a distance between a set of feature points in the background region of a first frame and the set of feature points in the background region of a subsequent frame.

13. A non-transitory tangible computer-readable medium comprising instructions when executed cause video processing circuitry of an electronic device to:
determine whether a transmitter is active;
enable a video stream in response to a first determination that the transmitter is active;
determine whether background motion in the video stream satisfies a threshold; and
set transmit power to a reduced power in response to a second determination that the background motion satisfies the threshold.

14. The non-transitory tangible computer-readable medium of claim 13, wherein the video stream is blocked from an operating system (OS) of the electronic device.

15. The non-transitory tangible computer-readable medium of claim 14, wherein the second determination indicates human proximity to the electronic device.

* * * * *